United States Patent
Padmanabhan et al.

(10) Patent No.: US 7,331,224 B2
(45) Date of Patent: Feb. 19, 2008

(54) TILT-INSENSITIVE FLOW SENSOR

(75) Inventors: Aravind Padmanabhan, Plymouth, MN (US); Ernest Satren, Bloomington, MN (US); Ulrich Bonne, Hopkins, MN (US); Robert Higashi, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 197 days.

(21) Appl. No.: 11/005,968

(22) Filed: Dec. 7, 2004

(65) Prior Publication Data

US 2006/0117845 A1 Jun. 8, 2006

(51) Int. Cl.
*G01F 1/68* (2006.01)
(52) U.S. Cl. .................................. 73/204.26
(58) Field of Classification Search ............. 73/204.26
See application file for complete search history.

(56) References Cited

U.S. PATENT DOCUMENTS

| 4,056,975 | A |   | 11/1977 | LeMay |
| 4,100,801 | A |   | 7/1978  | LeMay |
| 4,616,505 | A | * | 10/1986 | Jouwsma ............... 73/204.26 |
| 4,685,331 | A | * | 8/1987  | Renken et al. ......... 73/204.15 |
| 5,086,650 | A |   | 2/1992  | Harrington et al. |
| 5,237,523 | A |   | 8/1993  | Bonne et al. |
| 5,259,243 | A |   | 11/1993 | Drexel et al. |
| 5,311,447 | A |   | 5/1994  | Bonne |
| 5,631,417 | A |   | 5/1997  | Harrington et al. |
| 5,965,812 | A |   | 10/1999 | Manaka |
| 6,184,773 | B1 |  | 2/2001  | Bonne et al. |
| 6,322,247 | B1 |  | 11/2001 | Bonne et al. |
| 6,502,459 | B1 |  | 1/2003  | Bonne et al. |
| 6,571,623 | B1 | * | 6/2003  | Blasczyk et al. ........ 73/204.22 |
| 6,871,537 | B1 | * | 3/2005  | Gehman et al. ......... 73/204.26 |

OTHER PUBLICATIONS

Bonne, et al., "Versatile Microbridge Flow Control Sensor Structure and Applications," SAE Technical Paper Series, 22nd International Conference on Environmental Systems, Seattle, WA, 9 pages, Jul. 13-16, 1992.
Bonne, "Gas Composition Correction for Hot-Element Flow Microsensors," 6th IGT Smp. Nat. Gas Quality Measurements, Chicago, IL, 14 pages, Jun. 10-12, 1991.

\* cited by examiner

*Primary Examiner*—Harshad Patel
(74) *Attorney, Agent, or Firm*—Kris T. Fredrick

(57) ABSTRACT

A flow sensor is provided having a substrate with a sensing element and flow channel over the sensing element. The sensing element senses at least one property of a fluid. The flow channel is configured such that tilting the flow sensor does not have a significant effect on the measured signal. A device for measuring tilt in a system having a fluid flow path is also provided.

25 Claims, 16 Drawing Sheets

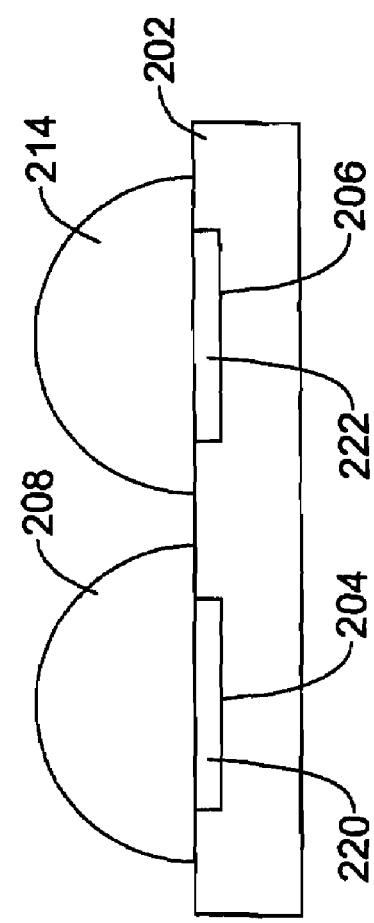
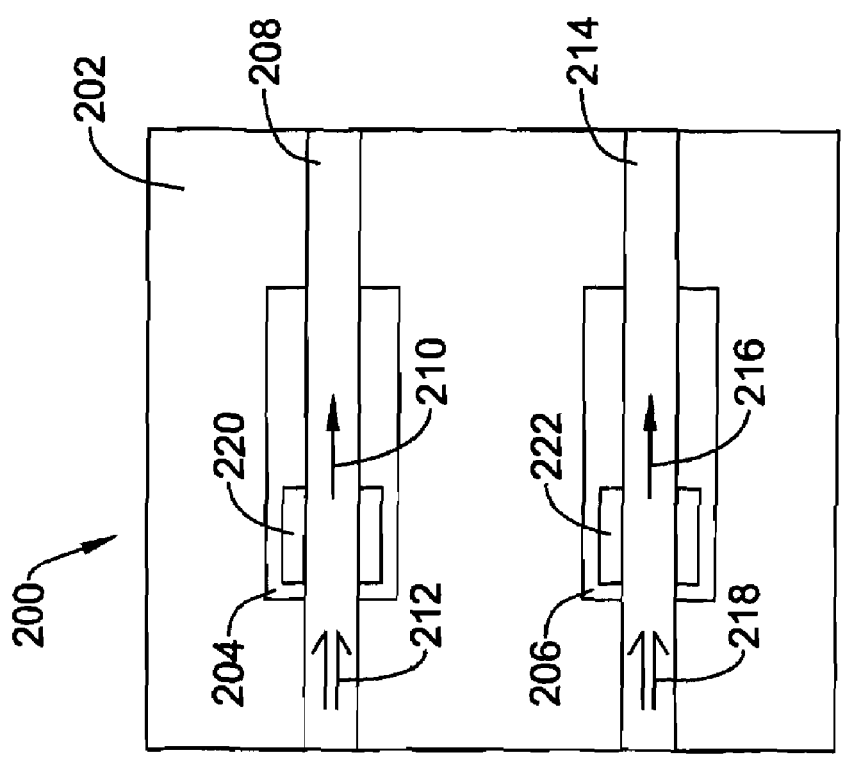

TILT-INSENSITIVE FLOW SENSOR

FIELD OF THE INVENTION

The present invention relates generally to sensors utilized to detect the quality and movement of fluids, particularly in liquid form. The present invention relates more particularly to thermal sensors of such fluids, such as fluid flow or property sensors implemented on silicon, glass, quartz, or other substrates in microstructure form. More particularly, the present invention relates to sensors that are insensitive to being tilted.

BACKGROUND

Flow sensors are utilized in a variety of fluid-sensing applications for detecting the movement of fluids, particularly fluids in liquid form. One type of flow measurement, for example, is based on thermal sensors, which can also be utilized to detect various properties of a fluid. Thermal sensors may be implemented, for example, over a silicon substrate in microstructure form. For convenience sake, and without limitation, the term "flow sensor" can be utilized to refer to such thermal sensors. (See e.g. U.S. Pat. No. 6,322,247 FIGS. 10a-f, and U.S. Pat. No. 6,184,773, which are both incorporated herein by reference.). The reader will appreciate that such sensors may also be utilized to measure intrinsic fluid properties such as thermal conductivity, specific heat (e.g. U.S. Pat. Nos. 5,237,523 and 5,311,447, which are both incorporated herein by reference.), non-intrinsic properties such as temperature, flow velocity, flow rate, and pressure, and other properties; and that the flows may be generated through forced or natural convection.

A thermal-type flow sensor can be formed from a substrate that includes a heating element and one or more heat-receiving, or sensing, elements. If two such sensing elements are utilized, they can be positioned at the upstream and downstream sides of the heating element relative to the direction of the fluid flow to be measured. When fluid flows along the substrate, it is heated by the heating element at the upstream side and the heat is then transferred non-symmetrically to the heat-receiving elements on either side of the heating element. Since the level of non-symmetry depends on the rate of fluid flow, and that non-symmetry can be sensed electronically, such a flow sensor can be used to determine the rate and the cumulative amount of the fluid flow.

Such flow sensors generally face potential problems when the sensors are used in a tilted, or non-horizontal orientation. Heat usually causes the density of a fluid to change. Less dense fluid tends to rise, while the more dense fluid falls. This circulation, or natural convection, generates a signal in a vertically oriented flow sensor, but generates no signal in a horizontally oriented flow sensor. The natural convection is added to the forced convection flow generated by a pump, causing discrepancies in the measured properties, specifically flow rate, of a flow sensor in a non-horizontal orientation. The tilt angle of the flow sensor is one of the factors influencing the natural convection flow in a flow sensor.

The usual solution to avoid such interference or discrepancies in measured properties is to mount the flow sensor in a horizontal position to avoid any tilting. Another solution described in U.S. Pat. No. 4,100,801, is to place the thermal flow sensor in a by-pass loop coupled to the fluid conduit. The present invention provides a flow sensor that is insensitive to tilting without diverting the fluid flow.

SUMMARY OF THE INVENTION

The present invention provides a thermal sensor utilized in the detection of the quality or properties of fluids, particularly liquids. The invention may also be utilized in the detection of gaseous fluid properties. The thermal sensor can be implemented on silicon, glass, quartz, or other substrates in microstructure form.

In one embodiment, the flow sensor includes a substrate, a sensing element having a heater and at least one thermal sensor located on the substrate, and a flow channel extending over the sensing element. The flow sensor provides accurate measurements in a tilted configuration. In a further embodiment, the flow channel has a cross-sectional area of less than or equal to 0.0001 square inches. In some embodiments, the flow channel is semicircular and has an inner diameter of less than or equal to 0.016 inches. In other embodiments, the flow channel is polygonal and has an aspect ratio of greater than 2:1. In still further embodiments, the polygonal flow channel has a height of less than 0.004 inches.

The invention also provides a method of reducing the tilt effect on a fluid flow sensor containing a flow channel disposed over a thermal sensor. The method involves providing a flow sensor with a first flow channel, measuring a first signal with the flow sensor in a horizontal configuration, moving the flow sensor into a tilted configuration and measuring a second signal. The first and second signals are compared and if the second signal is substantially different from the first signal, the method further comprising substituting a second flow channel for the first flow channel; the second flow channel having a cross-sectional area smaller than a cross-sectional area of the first flow channel. In some embodiments, the second flow channel has a height less than the height of the first flow channel.

In a further embodiment, the invention provides an improved, tilt-insensitive, flow sensor in which the cross-section of the flow channel is reduced to substantially eliminate tilt effect. The cross-section of the flow channel can be reduced by reducing the height of a polygonal flow channel or reducing the inner diameter of a semicircular flow channel.

In still further embodiments, the invention provides a tilt-insensitive flow sensor in which the cross-sectional area of the flow channel remains constant. In these embodiments, the height of the flow channel is reduced and the width is increased to substantially eliminate tilt effect.

In another embodiment, the invention provides a device for measuring tilt in a system having a fluid flow path. The device includes a first flow sensor having a first flow channel with a particular cross-sectional area, and a second flow sensor having a second flow channel with a cross-sectional area less than that of the first flow channel. The first and second flow sensors are connected adjacent each other in the fluid flow path. Substantially similar signals from the first and second flow sensors indicate the device is not tilted and substantially different signals from the first and second flow sensors indicate the device is in a tilted or non-horizontal orientation. If a difference in signals is detected, an adjustment can be made to eliminate tilt effect. In one embodiment, the signal processing of the signals from the first and second flow sensors is adjusted to eliminate tilt effect.

BRIEF DESCRIPTION OF THE DRAWINGS

The accompanying figures, like reference numerals refer to identical or functionally similar elements throughout the separate views.

FIGS. 17-18 are top and side views, respectively, showing a flow sensor having multiple flow channels.

DETAILED DESCRIPTION

The particular values and configurations discussed in these non-limiting examples can be varied and are cited merely to illustrate various embodiments of the present invention and are not intended to limit the scope of the invention. As used herein, the phrase "tilt effect" means a discrepancy in the measured signal of a flow sensor due to the flow sensor's flow channel being in a tilted, non-horizontal, orientation. The following discussion is generally directed to liquid fluids, but it is to be understood that the invention also applies to gaseous fluids.

The non-dimensional parameter that is used to describe the natural convection effects in a fluid is the Grashof Number. This number is the ratio of buoyancy forces to the viscous forces and is defined as follows:

$$Gr = \frac{L^3 \rho^2 g \operatorname{Sin}\theta \beta \Delta T}{\mu^2}$$

L=Length of the heated area
ρ=density
θ=angle between the flow channel axis and the horizontal plane
g =gravity (9.81 m/s$^2$)
β=Volumetric thermal expansion coefficient
µ=dynamic viscosity The Volumetric thermal expansion coefficient is defined as follows:

$$\beta = \frac{1}{\hat{V}}\left(\frac{\partial \hat{V}}{\partial T}\right)_P$$

$$\approx \frac{1}{\hat{V}}\left(\frac{\Delta V}{\Delta T}\right) = \frac{2(\rho_1 - \rho_2)}{(T_2 - T_1)(\rho_1 + \rho_2)} \text{ most liquids}$$

$$\approx \frac{1}{T} \text{ ideal gases}$$

The Grashof Number provides a measure of the significance of natural convection. When the Grashof Number is greater than 1,000, heat transfer coefficients should be corrected to reflect the increase due to free circulation.

A smaller Grashof Number implies smaller natural convection flow. Hence, a lower natural convection flow or a lower tilt effect can be achieved by reducing the size of the heated area (L); reducing the temperature difference (ΔT); reducing the tilt angle (θ); reducing the cross-sectional area of the flow channel; reducing the channel height above the sensor element; or reducing the measurement time. While the Grashof Number for thermal convection ties together the influence of heater length, temperature rise and pressure (or density) of a fluid, it does not include a parameter related to the space above the thermal source.

The difference in signal between a horizontal and vertical orientation is the convection flow signal. Measuring the natural convection flow signal and zero flow noise as a function of changes in the height and shape above the sensor chip provided the information need to design a flow channel insensitive to tilt.

Figure 1:
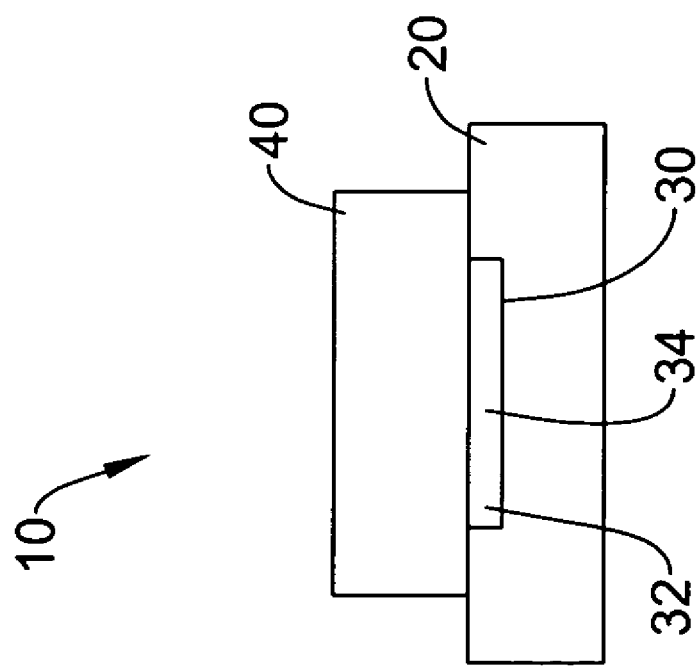
FIG. 1 is a cross-sectional view of a flow sensor with a rectangular flow channel.

The present invention is related to the design of flow channels in thermal flow sensors. The flow sensor 10, 100 generally includes a die or substrate 20 with a sensor element or chip 30 embedded therein or attached thereto, and a flow channel 40, 140 aligned over the sensor 30. See FIGS. 1 and 2. In one embodiment, the sensor 30 includes a heating element 34 and at least one thermal sensor 32. The die 20 can be fabricated using various glass materials, alumina, quartz or combinations of such materials. The flow channel 40, 140 can be formed from a polymeric material, such as Teflon®, or other materials, such as glass, quartz, sapphire and/or metal, such as, for example, stainless steel.

Figure 2:
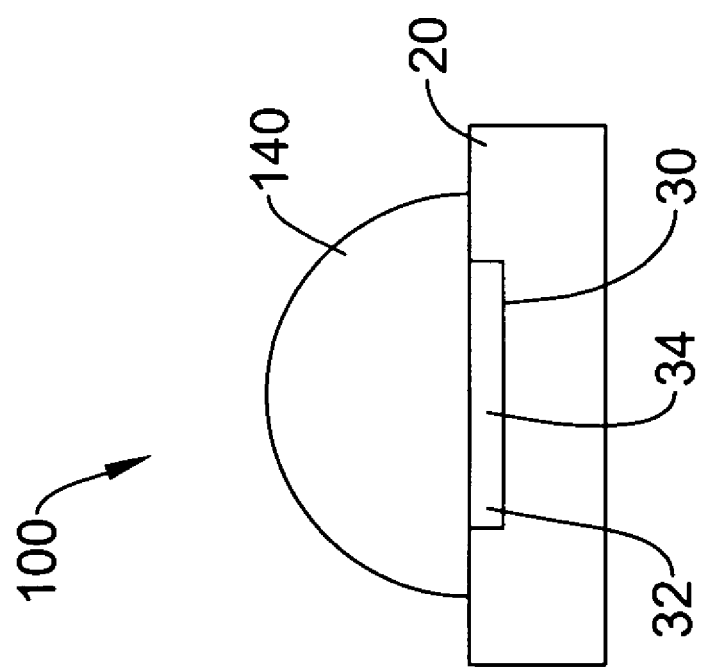
FIG. 2 is a cross-sectional view of a flow sensor with a semicircular flow channel.

In one embodiment, shown in FIG. 2, the flow channel 140 has a flat bottom and a semispherical or hemi-spherical top, creating a "D" shape in cross-section. The terms "semi-circular", "hemi-circular" and "D-shaped" are used interchangeably to describe this shape of flow channel. It will be understood that a semicircular cross-sectional shape of flow channel includes a half circle and part of a circle, including more than or less than half of a circle. The inner diameter of a D-shaped flow channel is generally used as an indication of its size. The cross-sectional area is another indication of the flow channel size. In another embodiment, shown in FIG. 1 the flow channel 40 is polygonal, such as square or rectangular. One way of indicating the size of square or rectangular flow channels is by calculating the cross-sectional area. Another way is to calculate the aspect ratio, which is the ratio of the width to the height.

In flow channels having a constant width, as the cross-sectional area decreases, the aspect ratio increases, and vice versa. When the widths are different, the aspect ratio may or may not increase with a decreasing cross-sectional area. For example, a first flow channel with dimensions of 0.02 inches (width) and 0.001 inches (height) has a cross-sectional area of 0.00002 square inches and an aspect ratio of 20:1 (see sensor 261 in Table 1). A second flow channel with dimensions of 0.02 inches (width) and 0.01 inches (height) has a cross-sectional area of 0.0002 square inches and an aspect ratio of 2:1. (see sensor 270 in Table 1). Comparing these flow sensors, as the cross-sectional area of the flow channel decreases from 0.0002 to 0.00002 square inches, the aspect ratio increases from 2:1 to 20:1.

In one embodiment of the invention, the flow channel has a cross-sectional area of less than or equal to 0.000101 square inches. The cross-sectional area of the flow channel can be reduced by reducing the height of the flow channel. In a further embodiment, the flow channel is polygonal in shape and has an aspect ratio of at least 5:1. The height of the flow channel can be less than or equal to 0.004 inches. In a still further embodiment, the flow channel is semicircular and has an inner diameter or height of less than or equal to 0.016 inches.

Figure 3:
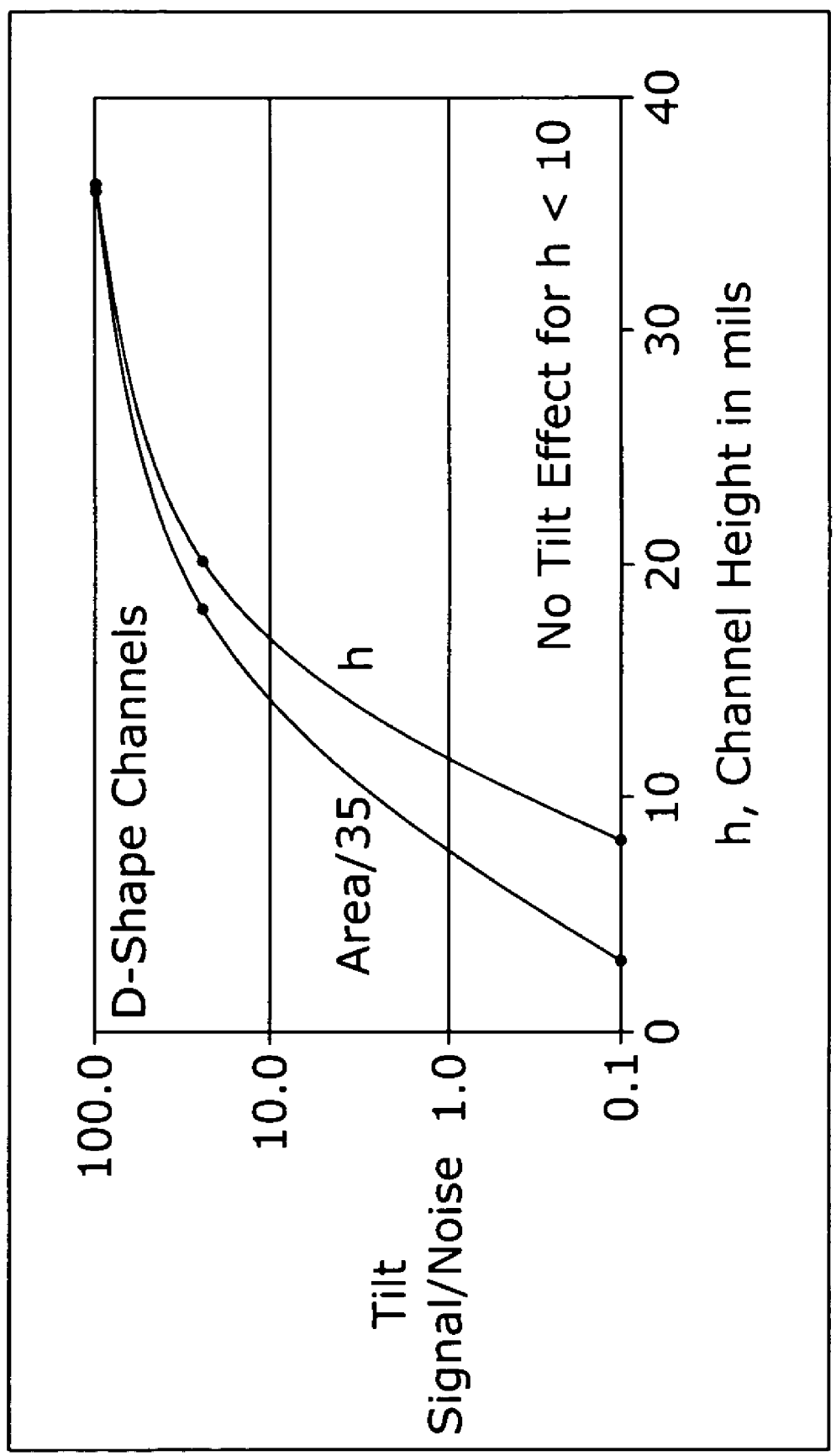
FIG. 3 is a graph of tilt signal/noise versus channel height for semicircular flow channels.
Figure 4:
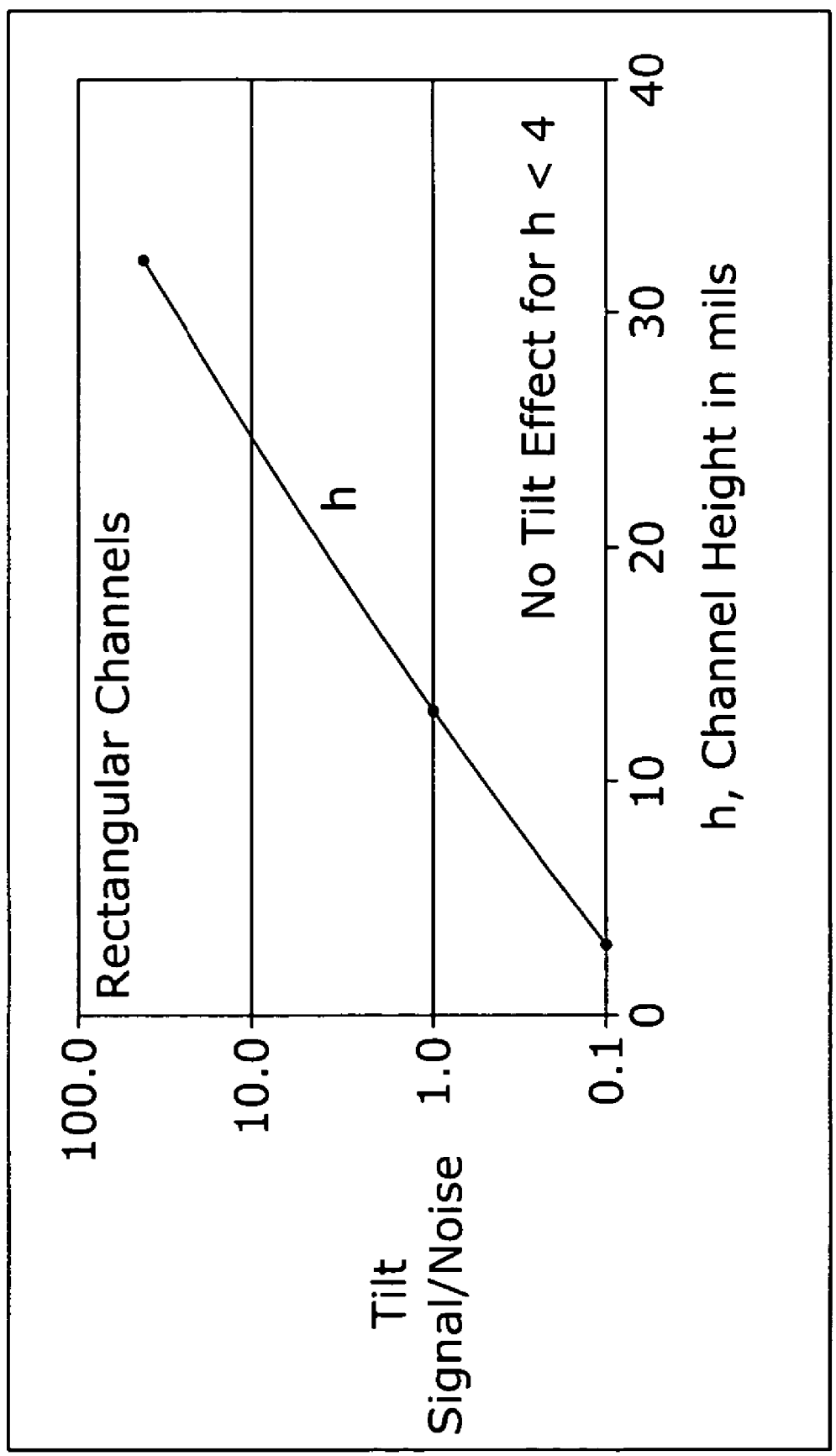
FIG. 4 is a graph of tilt signal/noise versus channel height for rectangular flow channels.

FIGS. 3 and 4 show tilt signal/noise versus channel height for semicircular (FIG. 3) and rectangular (FIG. 4) flow channels. As shown in the graphs, the larger space above the sensor chip provided by the rectangular channels must be compensated by a further reduction in the height above the chip in order to reduce the tilt effect to a level equivalent to the sensor output noise. Reducing the maximum flow channel height to below 0.010 inches for semicircular flow channels, and below 0.004 inches for rectangular channels pushes the tilt signal to the noise level, i.e., makes the sensor tilt-insensitive.

Reducing the height of the flow channel over the sensing chip reduces the tilt effect to below the sensor signal noise level in three ways. First, a smaller cross-sectional area above the sensing chip results in a higher flow velocity, which reduces the relative buoyancy effect. Alternatively, a constant cross-sectional area that is achieved by reducing the height and increasing the width of the flow channel, results in a similar increase in flow velocity. Second, the viscous flow rate is reduced when the fluid is forced through a smaller flow channel. Finally, reducing the flow channel height results in a reduction of the average fluid temperature rise induced by the heater, which in turn reduces the buoyancy contribution of the hot volume of liquid.

In one embodiment of the invention, the presence of tilt effect in a fluid flow sensor is identified and any tilt effect can then be reduced. The method involves the steps of providing a flow sensor with a first flow channel, measuring a first signal with the flow sensor in a horizontal configuration, moving the flow sensor into a tilted configuration and measuring a second signal, and comparing the first and second signals. If the second signal is substantially different from the first signal, the first flow channel is removed and a second flow channel having a cross-sectional area smaller than a cross-sectional area of the first flow channel is substituted for the first flow channel. In some embodiments, the smaller cross-sectional area of the second flow channel is achieved by using a second flow channel with a height less than a height of the first flow channel. In one embodiment, the first and second flow channels can have semicircular cross-sections. The inner diameter of the second flow channel can be less than or equal to 0.016 inches. In another embodiment, the first and second flow channels have polygonal cross-sections, and the aspect ratio of the second flow channel is greater than the aspect ratio of the first flow channel. The aspect ratio of the second flow channel can be greater than 2:1. In some embodiments, the aspect ratio of the second flow channel is at least 5:1.

Alternatively, two sensors can be used in parallel with one sensor as the actual flow sensor and the second sensor used as a reference sensor. The reference sensor is in contact with the same fluid but is not exposed to its forced convection. The actual flow signal is the difference between the flow sensor measurement and the reference sensor measurement.

In another embodiment, the invention provides a device for measuring tilt in a system having a fluid flow path. The device includes a first flow sensor having a first flow channel with a first cross-sectional area sized to be effected by tilt, and a second flow sensor having a second flow channel with a cross-sectional area less than that of the first flow channel such that the second flow channel is tilt-insensitive. The first and second flow sensors are connected adjacent each other in the fluid flow path. Substantially similar signals from the first and second flow sensors indicate the device is not tilted and substantially different signals from the first and second flow sensors indicate the device is in a tilted or non-horizontal orientation. For example, in one embodiment, the first flow channel has a cross-sectional area greater than or equal to 0.0002 square inches, and the second flow channel has a cross-sectional area less than or equal to 0.0001 square inches. In another embodiment, the first and second flow channels are semicircular, the first flow channel has an inner diameter of at least 0.04 inches, and the second flow channel has an inner diameter less than or equal to 0.016 inches. In a further embodiment, the first and second flow channels are rectangular, the first flow channel has an aspect ratio of less than or equal to 2:1, and the second flow channel has an aspect ratio of at least 5:1.

In a further embodiment, at least two first flow sensors having equal inner flow channel sizes are provided in an orthogonal orientation with respect to each other. The fluid flows through the flow sensors sequentially. In a method for reducing any tilt effect in the flow sensors, first signals are measured for each sensor with the flow sensors in a horizontal configuration. The flow sensors are then moved into a tilted configuration and second signals are measured. The first and second signals for each flow sensor are compared, and if the second signals are substantially different from the first signals, the first flow channels are replaced with second flow channels having smaller cross-sectional areas than the first flow channels. The use of two or more orthogonally positioned flow sensors enables the use of thermal mass flow sensors for larger flows than possible within the maximum inner channel sizes when a single flow sensor is used. Also, any possible gravity effects causing different flow signal readings in the orthogonally positioned flow sensors may be digitally processed to eliminate the effect of gravity, based on prior tilt-effect calibration signals.

In a still further embodiment, three or more flow sensors are used, all with identical inner flow channel dimensions. Fluid flows through the flow sensors sequentially. Two flow sensors are positioned in fixed horizontal and vertical positions, respectively, and a third flow sensor is moveable between a horizontal and vertical configuration. First signals are measured for all three flow sensors with the third sensor in a horizontal configuration, the third sensor is moved to a tilted position and second signals are measured for all three flow sensors. The first and second signals are compared, with the signals from the fixed flow sensors providing means for compensating for gravity effects.

Figure 5:
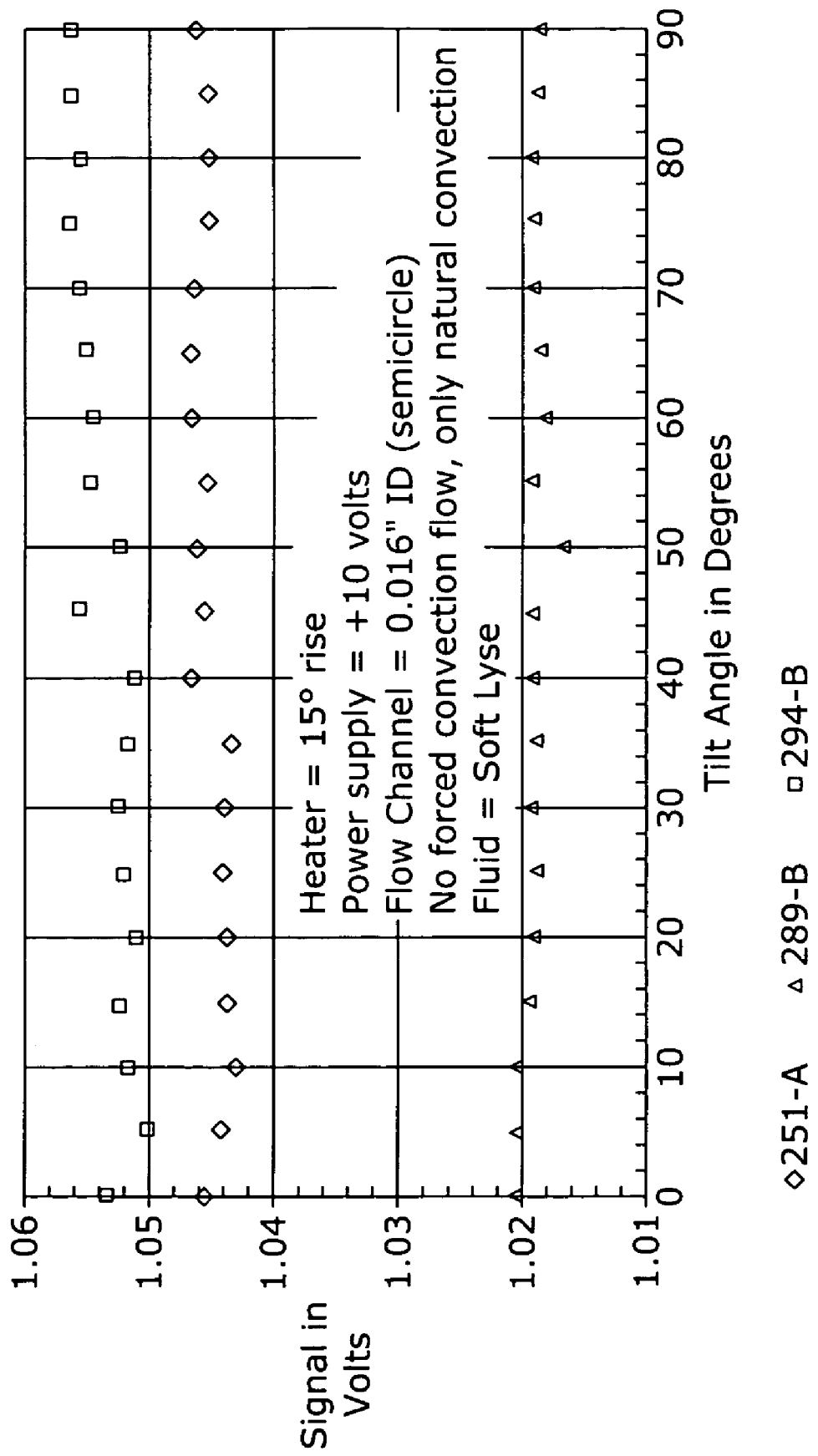
FIG. 5 is a graph of signal versus tilt angle with only natural convection in a semicircular flow channel.

The plots in FIGS. 5-16 show the tilt responses of various sensors. The experimental conditions for each test are described in the insert for each plot. FIG. 5 is a graph of signal measured in volts versus tilt angle in degrees for a semicircular flow channel with an inner diameter (ID) of 0.016 inches. Three different sensor chip designs were utilized: 251-A, 289-B, and 294-B. The heater in the sensor produced a 15° C. temperature rise. There was no forced flow through the flow channel, only natural convection. The graph in FIG. 5 shows that for semicircular flow channels with an ID of 0.016 inches, the signal received by the sensor chip remained substantially constant when the flow sensor was tilted from 0 to 90 degrees. Tilt angle thus did not have a substantial effect on the signal received by the sensor chip.

Figure 6:
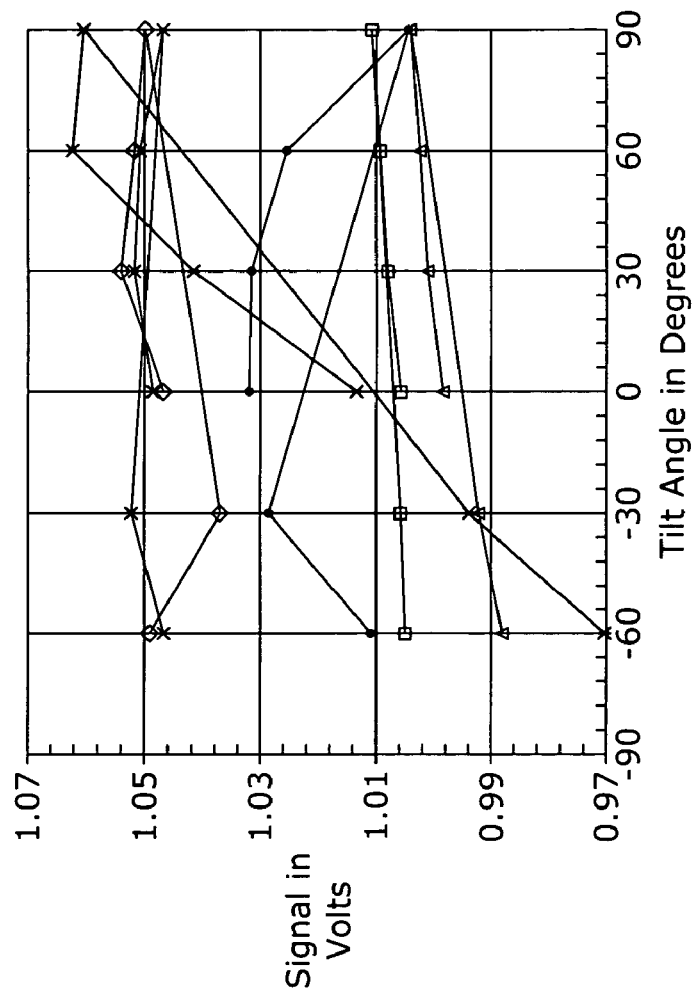
FIG. 6 is a graph of signal versus tilt angle with only natural convection in flow channels of various shapes and sizes.

In contrast to FIG. 5, the graph in FIG. 6 shows that under similar circumstances, tilt angle did have an effect on some flow channels with other dimensions. As in FIG. 5, flow channels with a substantially constant signal over the range of tilt angles are tilt-insensitive. The graph shows that the rectangular flow channel 270 (Δ) with a height of 0.01 inch exhibited some tilt effect, while rectangular flow channels 269 (□) and 261 (◇), having heights of 0.004 inches and 0.001 inches, respectively, exhibited substantially no tilt effect. Three semicircular flow channels, having inner diameters of 0.016 inches (258 x), 0.05 inches (Q1*), and 0.04 inches (256●) were also tested. Flow channel Q1(*) had the largest inner diameter at 0.05 inches, and also exhibited the largest range in signal when tilted. This flow channel thus had a significant tilt effect. Flow channel 256 (●), with an inner diameter of 0.04 inches also exhibited a tilt effect. The smallest flow channel 258 (x) with an ID of 0.016 inches exhibited substantially no tilt effect. Even with no forced fluid flow, the flow channels with a larger space above the sensor exhibited a significant change in signal when tilted. The size of the flow channel thus has an impact on whether or not the tilt angle affects the signal.

Figure 16:
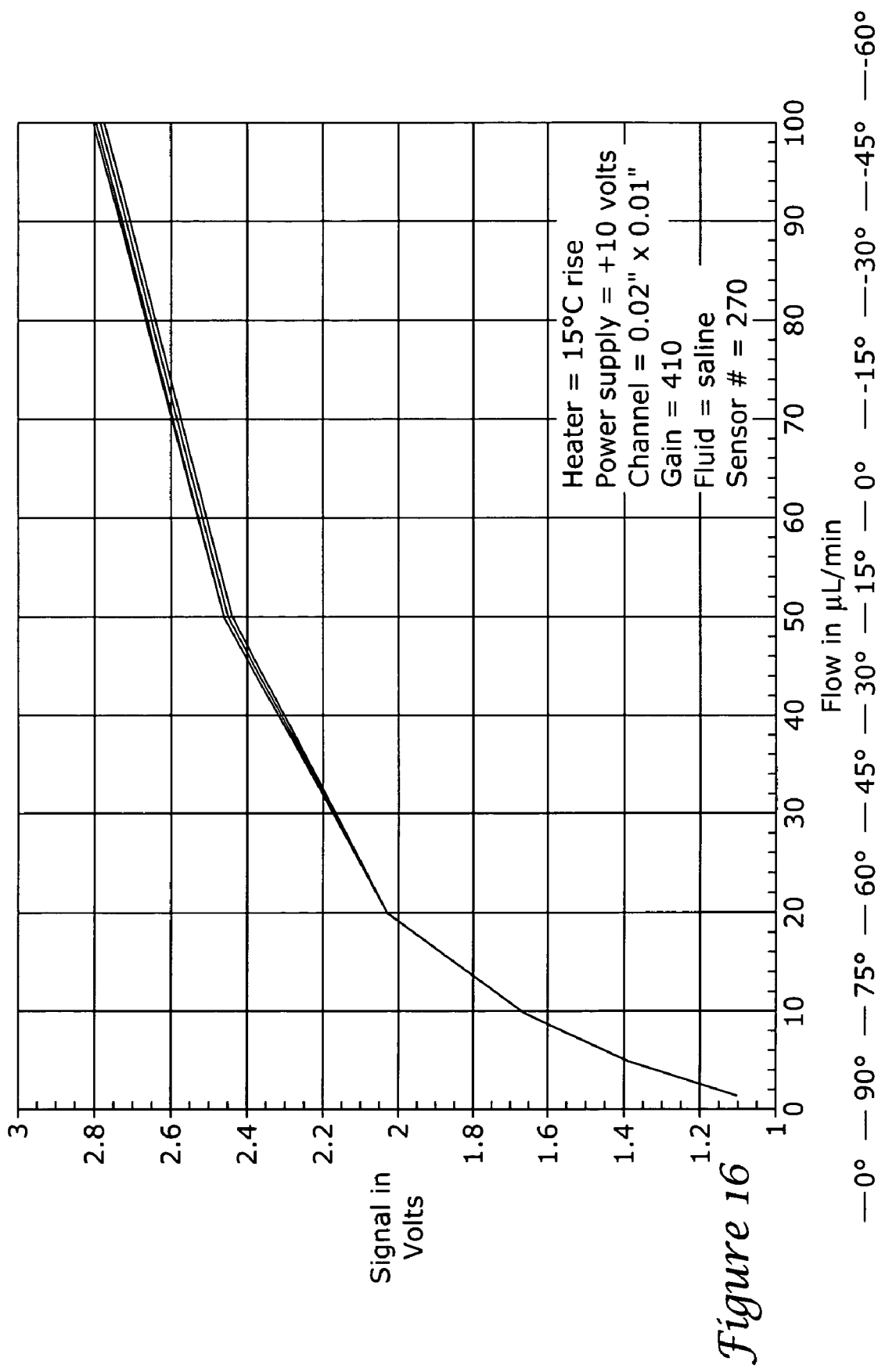

FIGS. 7-15 are graphs of signal versus flow rate for various sizes of semicircular flow channels at various tilt angles. FIG. 16 is a graph of signal versus flow rate for a rectangular flow channel. In the graphs, each line represents the signal versus flow rate for the flow sensor tilted at a particular angle. Thus, the closer the lines are to each other, the less effect tilt angle has on that flow sensor, while lines spaced apart indicate tilting the flow sensor has a substantial effect on the signal received by that flow sensor. The data from FIGS. 6-16 is summarized in Table 1.

Flow channels with an ID of 0.016 inches or less exhibited no tilt effect. Regardless of shape, flow channels with a cross-sectional area of 0.000101 square inches or less were insensitive to the tilt effect.

FIGS. 17 and 18 are top and side view, respectively, showing an illustrative flow sensor 200 having multiple flow channels. As shown in FIG. 17, the flow sensor 200 can include a die or substrate 202 with a fluid flow sensor 204 and a reference sensor 206 each embedded or attached to the die or substrate 202. The fluid flow sensor 204 can include a first flow channel 208 in fluid communication with a fluid 210 exposed to a force fluid convection, which is depicted generally by arrow 212 in FIG. 17. The reference sensor 206, in turn, can include a second flow channel 214, sometimes oriented generally parallel to the first flow channel 208, and in fluid communication with a fluid 216 exposed to only a natural fluid convection, as further depicted generally by arrow 218. In some embodiments, a heater element 220,222 may be provided for each of the fluid and reference flow sensors 204,206. In use, sensor signals from the fluid flow

TABLE 1

Summary of all tilt testing results to date. Tilt-insensitive designs are indicated by a *.

| Sensor #/ Figure # | Mask Design | Sensor Design | Channel Height (inches) | Flow Channel Description | Flow Channel Cross-sectional area (in2) | Ranking of Area | Tilt Sensitivity |
|---|---|---|---|---|---|---|---|
| 194/9 | 0933 | A | 0.036 | Machined 0.04" ID acrylic | 0.001269 | Second | Yes |
| 251/5, 13* | 0933 | A | 0.008 | Machined 0.016" ID Ultem 1000 | 0.000101 | Fifth | No |
| 256/6, 7 | 0933 | A | 0.02 | Short 0.04" ID semicircle | 0.000629 | Third | Yes |
| 258/6* | 0933 | A | 0.008 | Machined 0.016" ID Ultem 1000 | 0.000101 | Fifth | No |
| 261/6* | 0933 | A | 0.001 | 0.02" × 0.001" mini | 0.000020 | Seventh | No |
| 269/6* | 0933 | A | 0.004 | 0.02" × 0.004" mini | 0.000080 | Sixth | No |
| 270/6, 16 | 0933 | A | 0.01 | 0.02" × 0.01" mini | 0.000200 | Fourth | Yes |
| 289/5, 11* | 0933 | B | 0.008 | Machined 0.016" ID Ultem 1000 | 0.000101 | Fifth | No |
| 294/5, 12* | 0933 | B | 0.008 | Machined 0.016" ID Ultem 1000 | 0.000101 | Fifth | No |
| 314 | 1903 | C | 0.008 | Machined 0.016" ID Ultem 1000 | 0.000101 | Fifth | Inconclusive |
| 315/8 | 1903 | C | 0.036 | Machined 0.04" ID acrylic | 0.001269 | Second | Inconclusive |
| 316/15* | 1903 | C | 0.008 | Machined 0.016" ID Ultem 1000 | 0.000101 | Fifth | No |
| 349/14* | 933 | A | 0.008 | Machined 0.016" ID Ultem 1000 | 0.000101 | Fifth | No |
| Q1/6, 10 | 0933 | A | 0.05 | Molded 0.053" ID Radal | 0.002163 | First | Yes |

Figure 7:
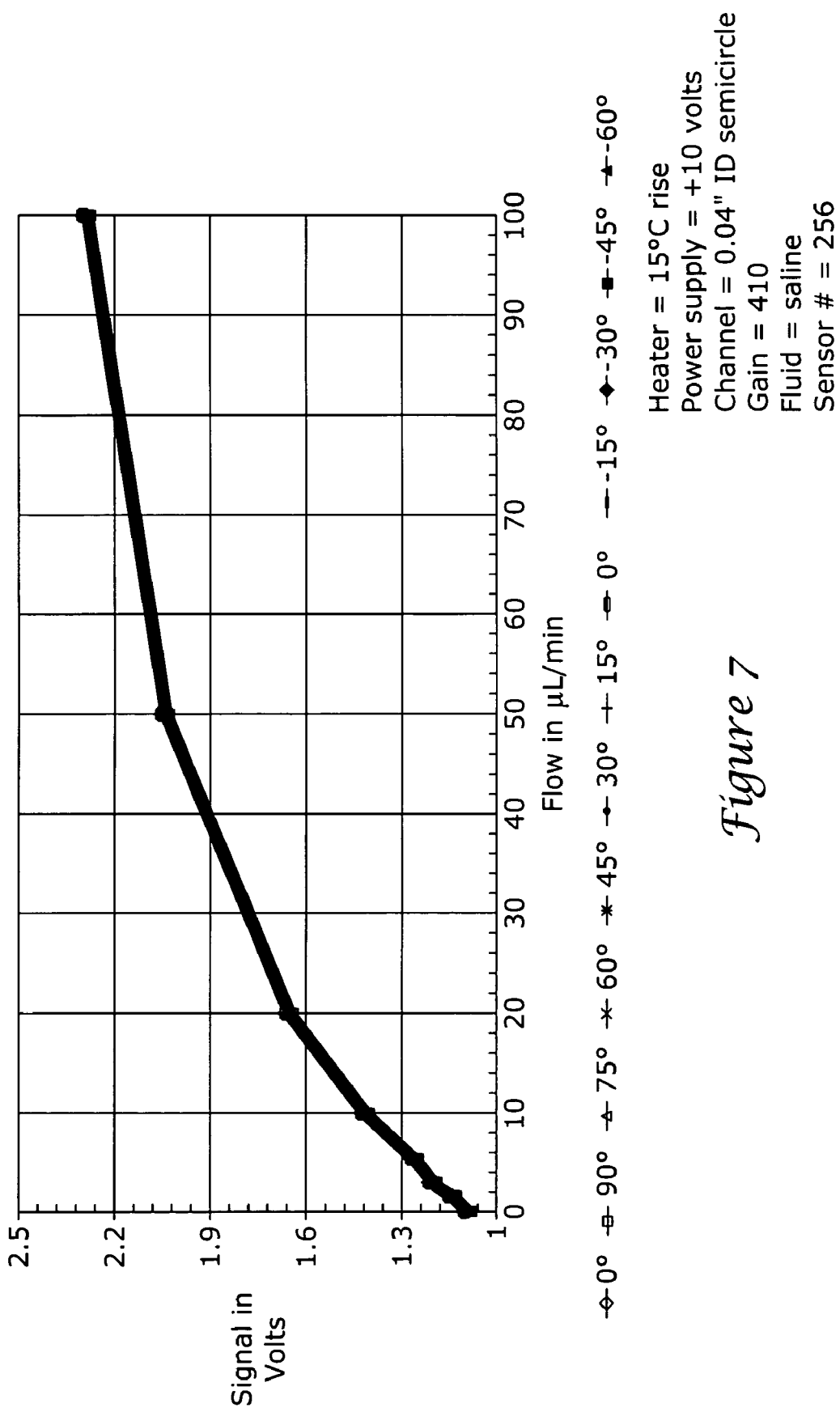
FIGS. 7-16 are graphs of signal versus flow rate with forced flow in various sizes and shapes of flow channels.
Figure 8:
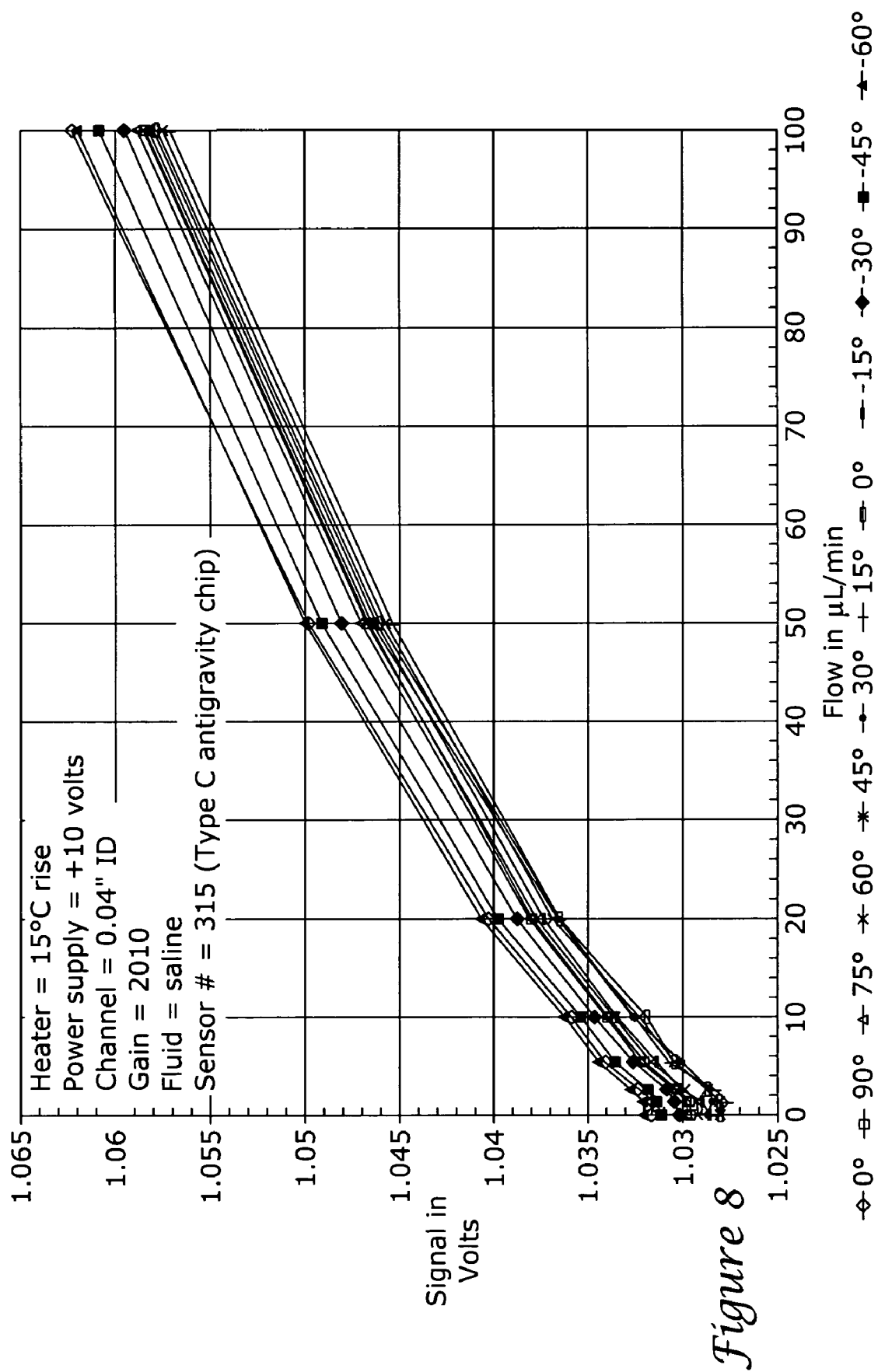
Figure 9:
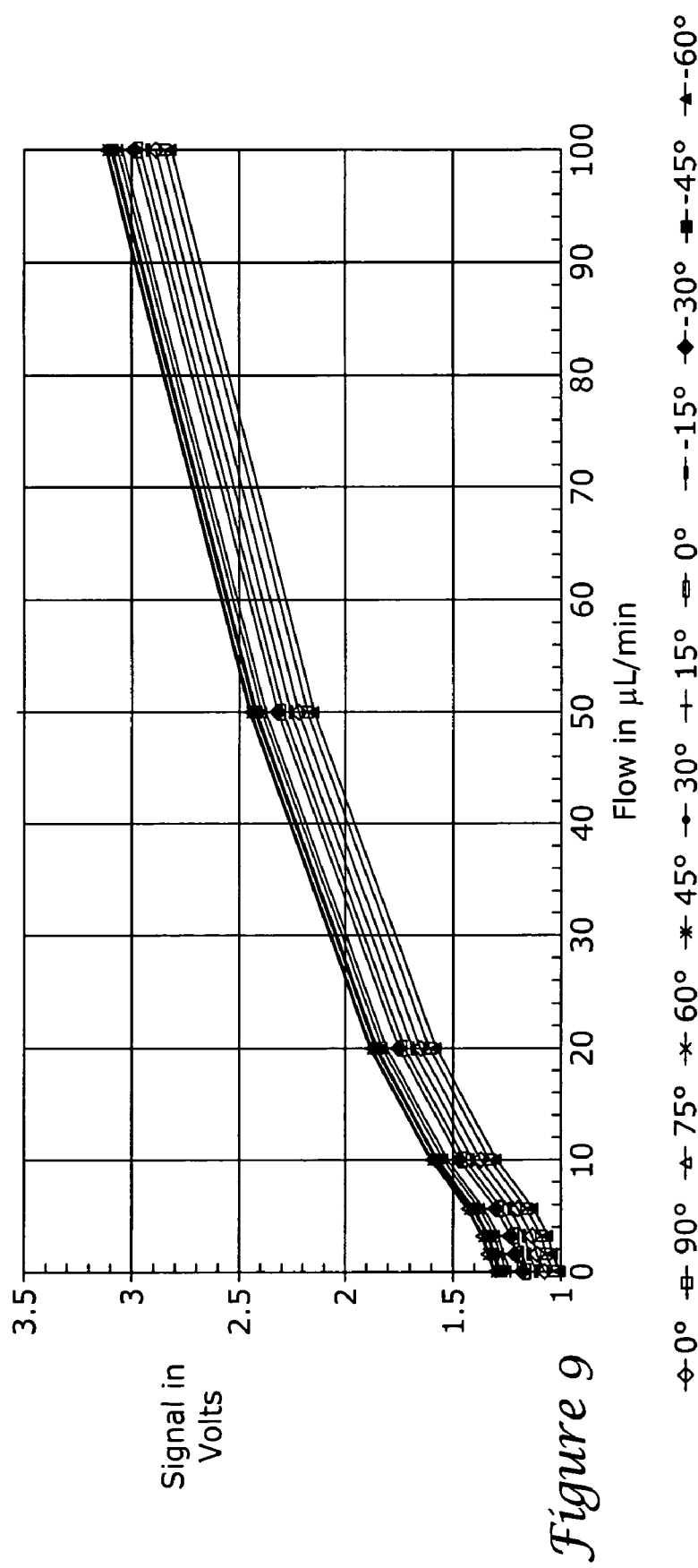
Figure 10:
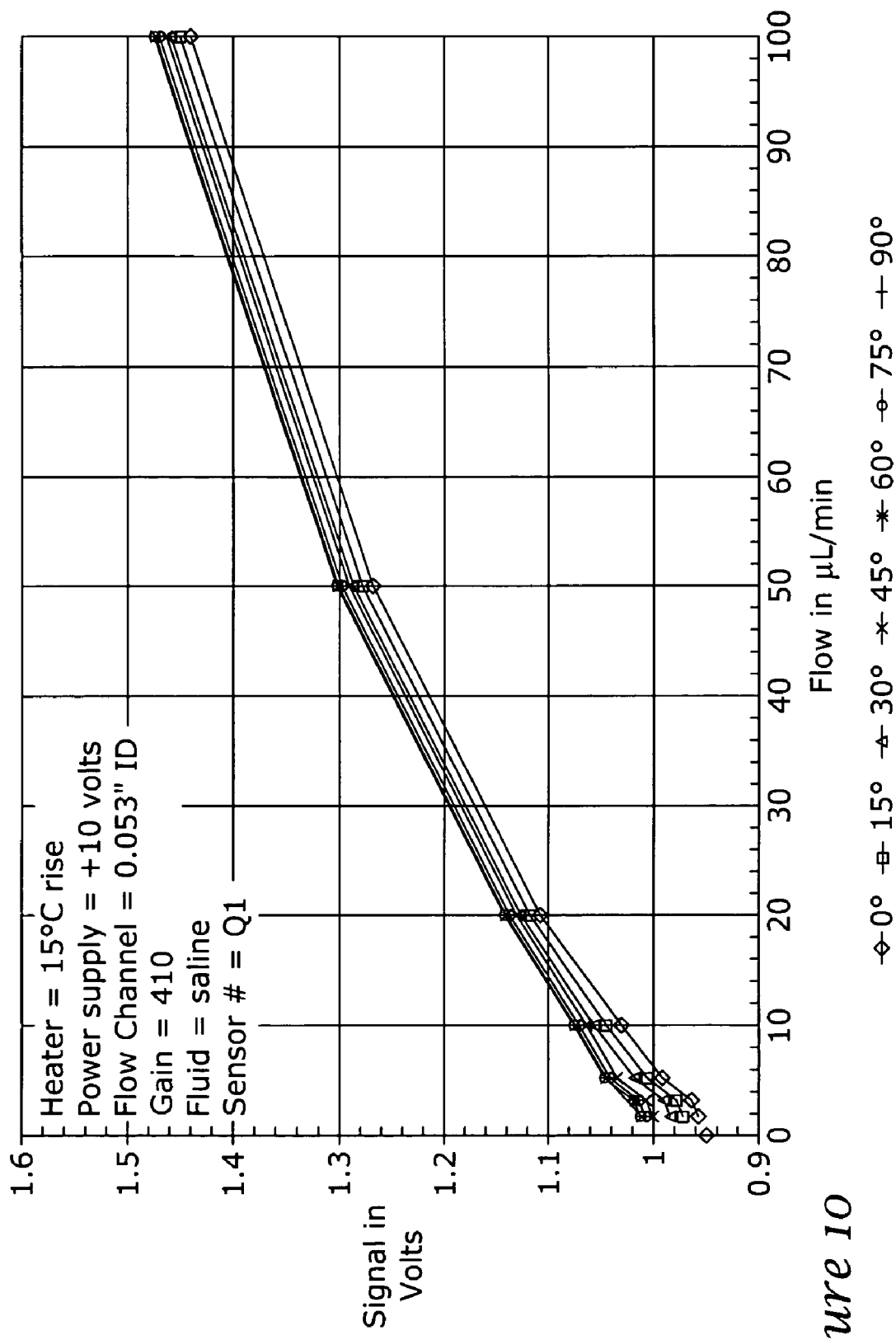
Figure 11:
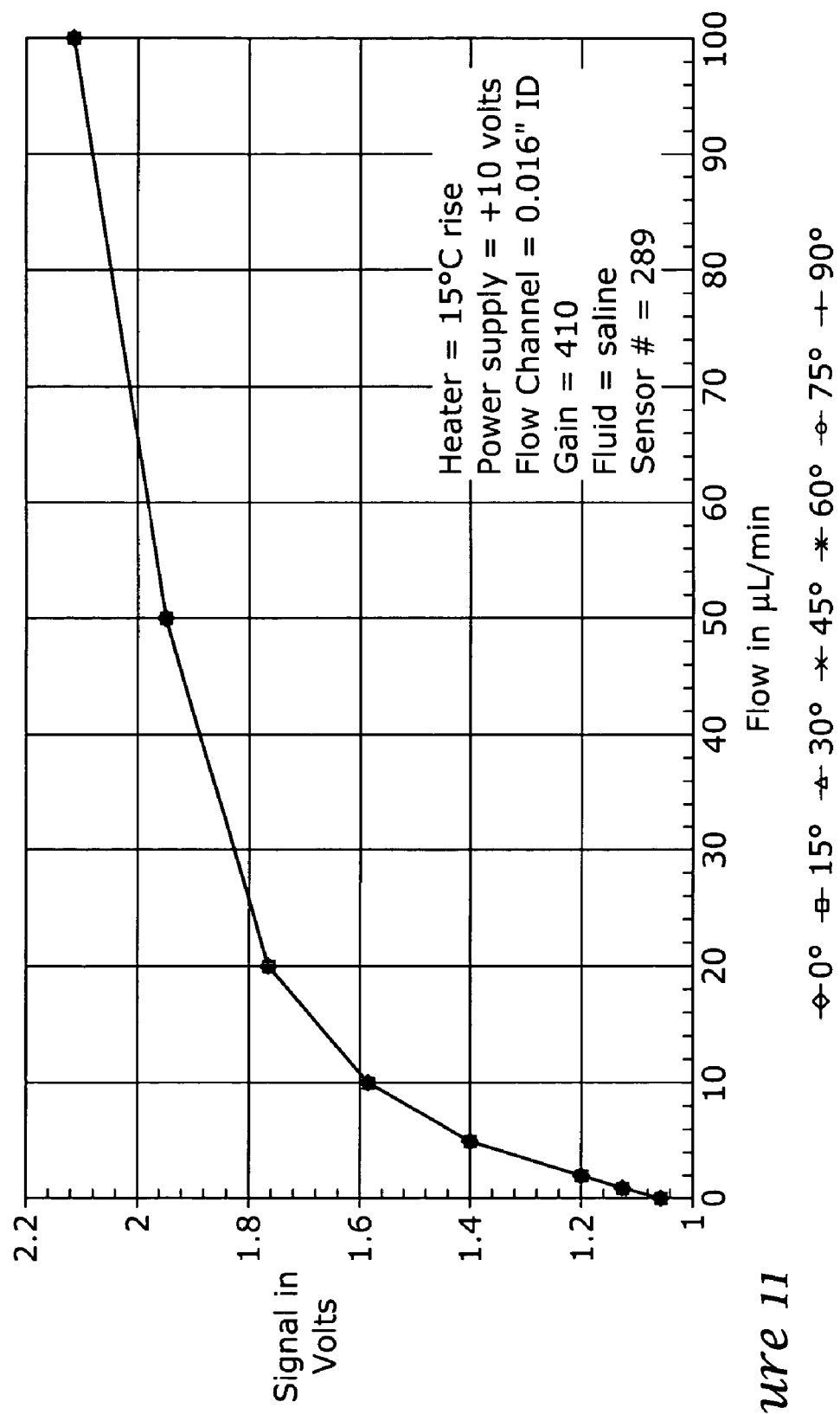
Figure 12:
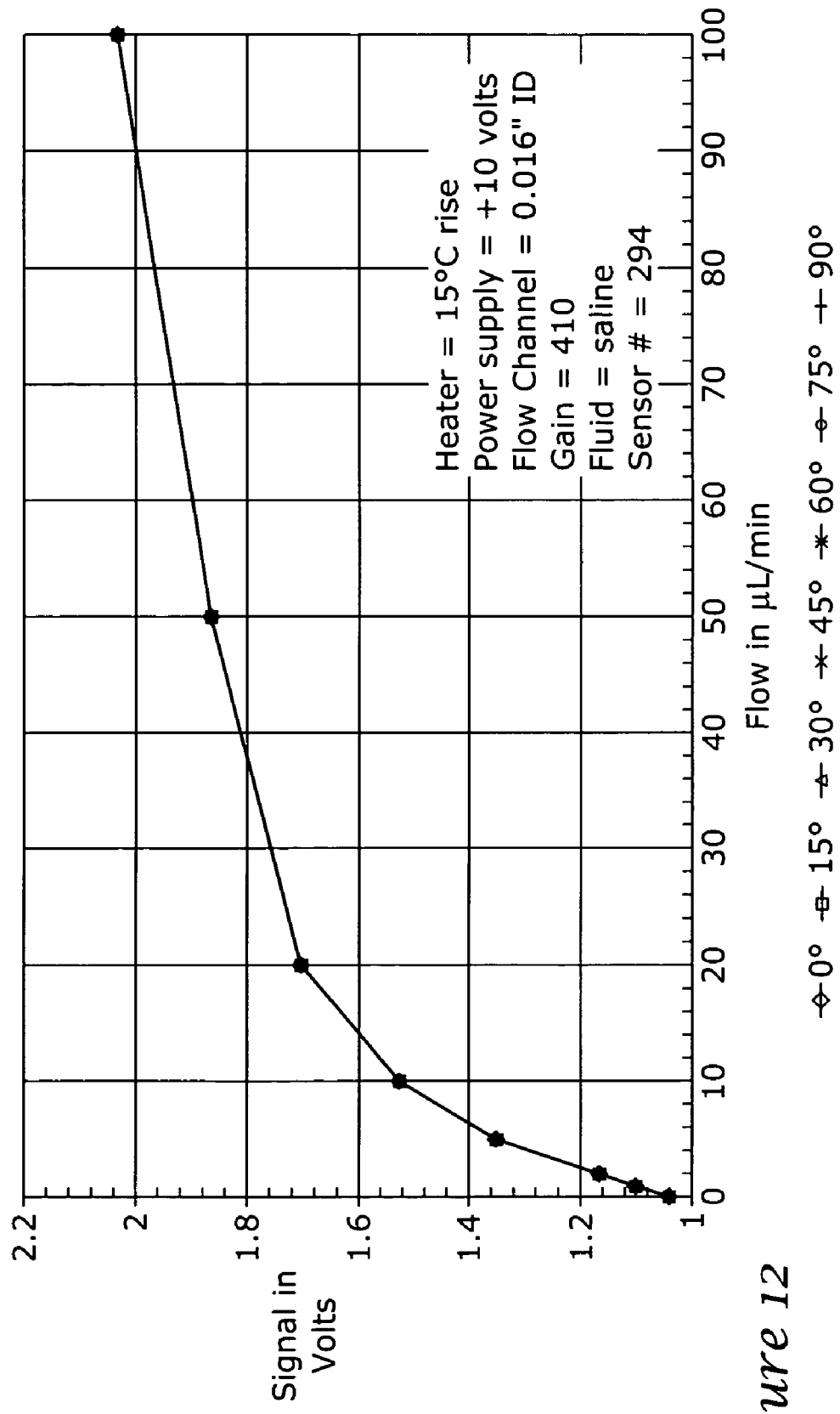
Figure 13:
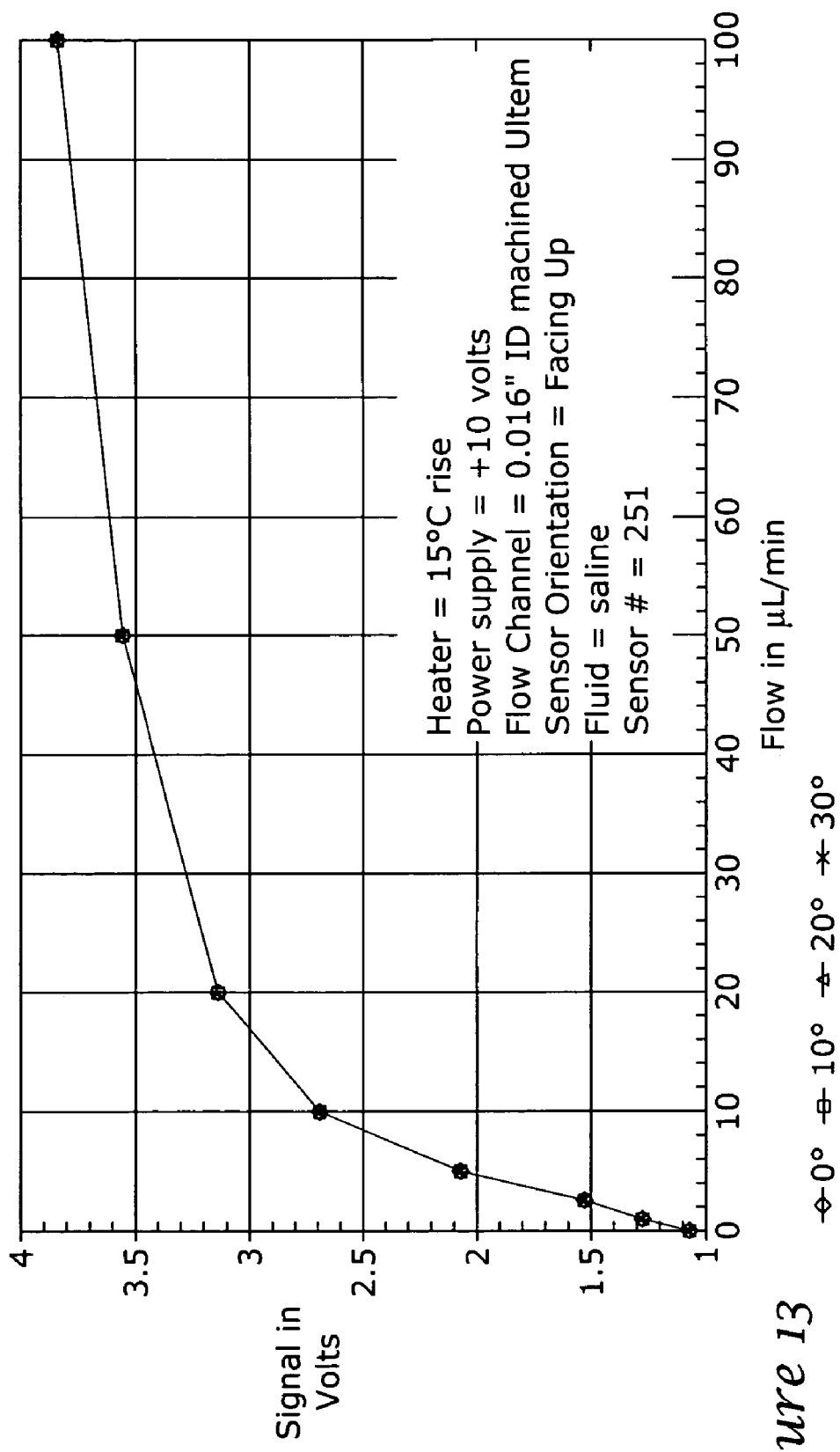
Figure 14:
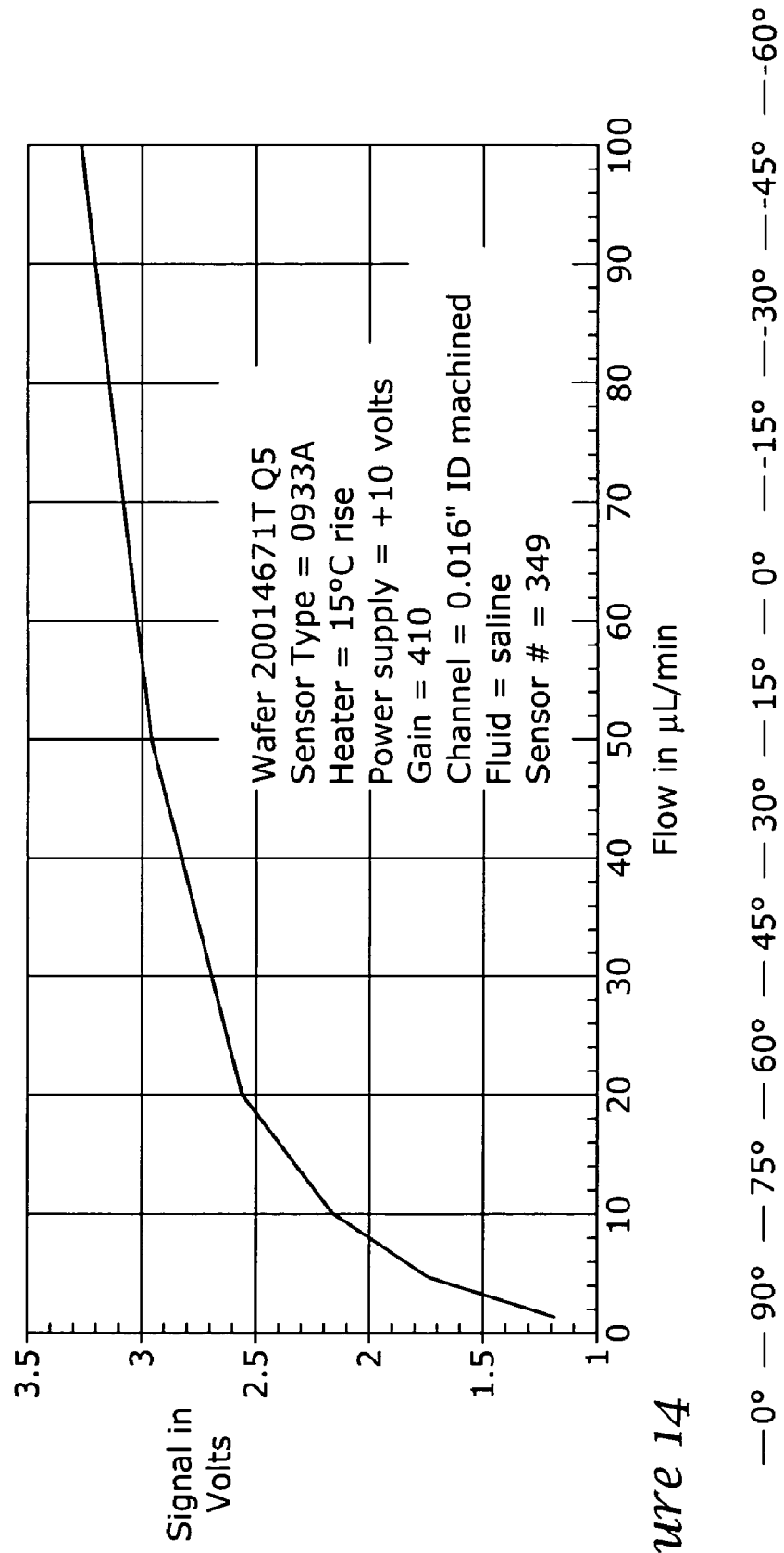
Figure 15:
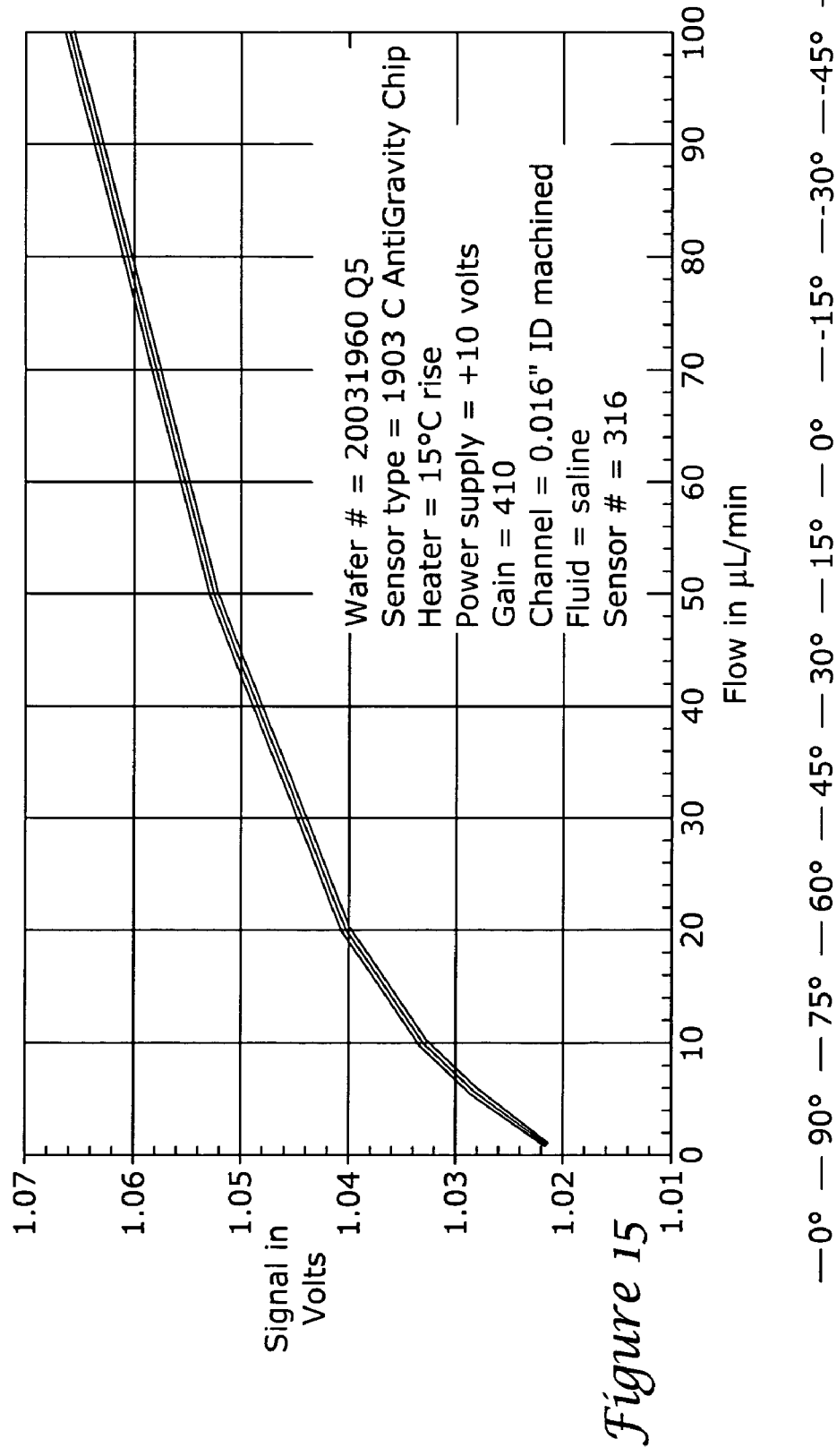

FIG. 7 shows that for a semicircular flow channel with an ID of 0.04 inches, tilting the sensor had a slight effect on the signal, and the effect was substantially constant over a wide range of flow rates. FIGS. 8 and 9 show that two other semicircular flow channels with an ID of 0.04 inches exhibited significant tilt effect over a wide range of flow rates. FIG. 10 illustrates the tilt effect on a semicircular flow channel with an ID of 0.053 inches. Tilt had a significant effect on the flow measurements of this flow channel. FIGS. 11-15 show that tilting a flow sensor with a semicircular flow channel having an ID of 0.016 inches had substantially no effect on the signal over a wide range of flow rates.

FIG. 16 shows that a rectangular flow channel with a height of 0.01 inches and an aspect ratio of 2:1 was effected by tilt, particularly at flow rates above 50 μL/min. Two additional flow sensors with rectangular flow channels were tested for tilt effect. The sensors, numbers 261 and 269, shown in FIG. 6, had flow channels with heights of 0.001 inches and 0.004 inches and aspect ratios of 20:1 and 5:1, respectively. Neither flow sensor was substantially affected by tilt.

Rectangular flow channels having heights of 0.004 inches or less and aspect ratios of at least 5:1 were not substantially affected by tilt. Semicircular flow channels having an ID of less than 0.04 inches were not substantially affected by tilt.

sensor 204 and reference sensor 208 can be compared with each other to determine whether a tilt-induced convection is present within the first flow channel 208.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A tilt insensitive flow sensor comprising:
   a substrate;

a sensing element on the substrate, the sensing element including a heater and at least one thermal sensor; and a flow channel in thermal communication with the sensing element;

wherein the flow channel has a transverse cross-sectional area configured in size and/or aspect ratio to reduce tilt-induced convection of fluid within the flow channel.

2. The tilt insensitive flow sensor of claim 1, wherein the flow channel has an aspect ratio of at least 5:1.

3. The tilt insensitive flow sensor of claim 1, wherein the flow channel is semicircular and has an inner diameter of less than or equal to 0.016 inches.

4. The tilt insensitive flow sensor of claim 1, wherein the flow channel is polygonal and has a height of less than or equal to 0.004 inches.

5. The tilt insensitive flow sensor of claim 1, wherein the flow channel is adapted to receive liquids.

6. In a flow sensor having a flow channel in thermal communication with a sensing element, wherein the sensor includes a heater and one or more thermal sensors, the improvement comprising:

providing a flow channel having a transverse cross-section adapted to substantially eliminate tilt effect of the flow sensor.

7. The flow sensor of claim 6, wherein the transverse cross-section of the flow channel has a height and a width, and wherein the height is less than the width.

8. The flow sensor of claim 7, wherein the flow channel has a semicircular transverse cross-section and the height of the flow channel is less than or equal to 0.016 inches.

9. The flow sensor of claim 6, wherein the flow channel has a rectangular transverse cross-section and the height of the flow channel is less than or equal to 0.004 inches.

10. A tilt insensitive flow sensor comprising:

a substrate;

a sensing element adjacent to the substrate, the sensing element including at least one heater and at least one thermal sensor; and a flow channel in thermal communication with the sensing element, the flow channel adapted to receive a fluid flow including at least one fluid of interest having one or more fluid properties;

wherein the flow channel has a transverse cross-sectional area configured in size and/or aspect ratio to reduce tilt-induced convection of the fluid within the flow channel, said transverse cross-sectional area selected based at least in part on at least one of said one or more fluid properties.

11. The tilt insensitive flow sensor of claim 10, wherein the selection of size and/or aspect ratio of the transverse cross-sectional area of the flow channel is based at least in part on the density of the fluid.

12. The tilt insensitive flow sensor of claim 10, wherein the selection of size and/or aspect ratio of the transverse cross-sectional area of the flow channel is based at least in part on the viscosity of the fluid.

13. The tilt insensitive flow sensor of claim 10, wherein the selection of size and/or aspect ratio of the transverse cross-sectional area of the flow channel is based at least in part on the volumetric thermal expansion coefficient of the fluid.

14. The tilt insensitive flow sensor of claim 10, wherein the selection of size and/or aspect ratio of the transverse cross-sectional area of the flow channel is based at least in part on the thermal conductivity of the fluid.

15. The tilt insensitive flow sensor of claim 10, wherein the selection of size and/or aspect ratio of the transverse cross-sectional area of the flow channel is based at least in part on the specific heat of the fluid.

16. The tilt insensitive flow sensor of claim 10, wherein the flow channel has an aspect ratio of at least 5:1.

17. The tilt insensitive flow sensor of claim 10, wherein the flow channel is semicircular and has an inner diameter of less than or equal to 0.016 inches.

18. The tilt insensitive flow sensor of claim 10, wherein the flow channel is polygonal and has a height of less than or equal to 0.004 inches.

19. The tilt insensitive flow sensor of claim 10, wherein said fluid is a liquid.

20. The tilt insensitive flow sensor of claim 10, wherein said fluid is a gas.

21. A tilt insensitive flow sensor, comprising:

a fluid flow sensor having a first flow channel in fluid communication with a fluid exposed to a forced fluid convection;

a reference sensor having a second flow channel in fluid communication with a fluid exposed to only a natural fluid convection, the second flow channel oriented in a direction substantially parallel to said first flow channel; and wherein sensor signals from said fluid flow sensor and said reference sensor are comparable with each other to determine whether a tilt-induced convection is present within the first flow channel.

22. A tilt insensitive flow sensor comprising:

a substrate;

a sensing element on the substrate, the sensing element including a heater and at least one thermal sensor; and a flow channel in thermal communication with the sensing element;

wherein the flow channel has a semicircular transverse cross-sectional area configured in size and/or aspect ratio to reduce tilt-induced convection of fluid within the flow channel.

23. The tilt insensitive flow sensor of claim 22, wherein the flow channel has an aspect ratio of at least 5:1.

24. The tilt insensitive flow sensor of claim 22, wherein the flow channel has an inner diameter of less than or equal to 0.016 inches.

25. The tilt insensitive flow sensor of claim 22, wherein the flow channel is adapted to receive liquids.

* * * * *